Figure 1:
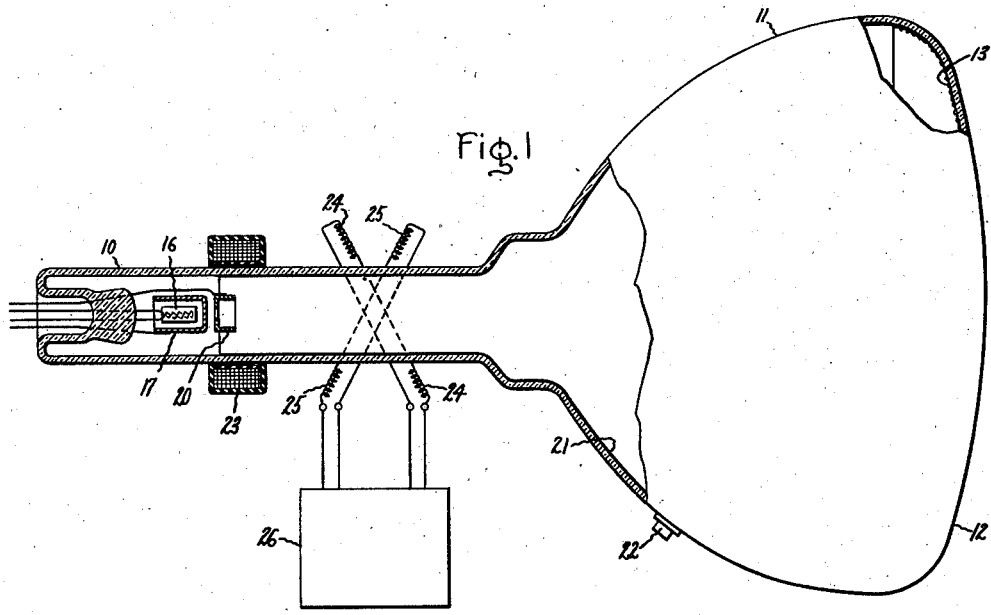

April 16, 1946.  G. R. FONDA  2,398,629
LUMINESCENT MATERIAL
Filed Dec. 26, 1942

Inventor:
Gorton R. Fonda,
by Harry E. Dunham
His Attorney.

Patented Apr. 16, 1946

2,398,629

UNITED STATES PATENT OFFICE 2,398,629

LUMINESCENT MATERIAL

Gorton R. Fonda, Schenectady, N. Y., assignor to General Electric Company, a corporation of New York Application December 26, 1942, Serial No. 470,180

4 Claims. (Cl. 252—301.6)

The present invention relates to phosphors suitable for use in cathode ray devices such, for example, as devices adapted for use in range-finding and direction-finding equipment.

One class of range and direction-finding equipment functions by transmitting electromagnetic radiations and then determining the direction and time of return of such of these radiations as are reflected from the object whose location is to be ascertained. In equipment of this class, the cathode ray tube is a most useful tool for providing the required information concerning reflected radiations. This is accomplished by causing cathode rays (electron stream) to produce on the tube screen a visible trace or image in a form which is determined directly by the received radiations. In order to facilitate the interpretation of the information thus provided and more especially in order to provide an indication of any change in the location of the object being considered, it is desirable that the trace produced on the tube screen persists for an appreciable interval of time without excess diminution of luminosity.

It is a primary object of the present invention to provide an improved phosphor in which the aspect of persistence of luminosity is realized to a desired degree.

The present invention deals with a luminescent material, or phosphor, comprising suitably activated zinc or cadmium silicate the luminescence of which is modified by arsenic. The light emitted by the arsenic-modified phosphor persists without excessive diminution of brightness for an appreciable interval after the exciting source has ceased.

While the modification of a phosphor of this type with arsenic is not broadly new, I have discovered that when the modifying arsenic in the phosphor calculated as $As_2O_5$ ranges within the limits of about .02 to 1.0 per cent of the phosphor the emission of light by phosphorescence (that is, when the exciting source is extinguished) is sufficiently strong relatively to the emission of light when the exciting source is operative that a pattern of successive impressions on a luminescent screen made up of such phosphor will have desirable persisting intensity.

While the fluorescence may be excited either by cathode rays or by ultraviolet, I shall describe my invention with particular reference to cathode ray devices.

The features of the invention desired to be protected herein are pointed out in the appended claims. The invention, together with further objects and advantages thereof, may best be understood by reference to the following description taken in connection with the drawing in which Fig. 1 is a sectional view of a cathode ray tube suitably embodying the invention, and Fig. 2 is a graph indicating the luminosity of phosphors containing different amounts of arsenic, the luminosity being compared both during a period of excitation and also when the exciting source has ceased to function.

Figure 2:
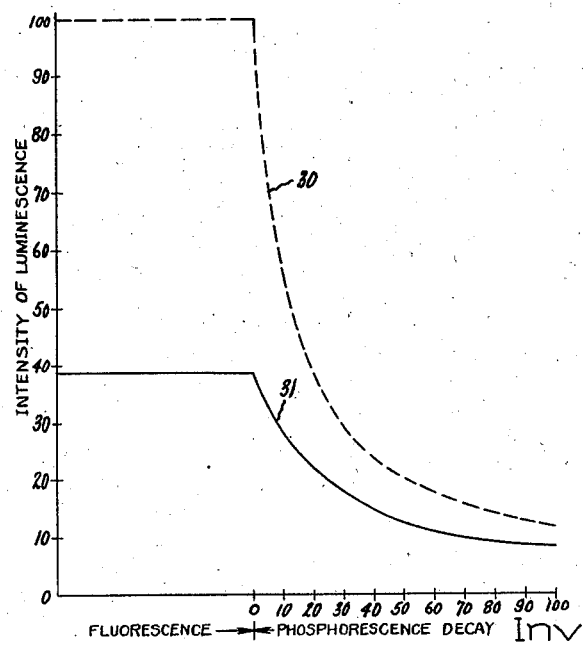

Referring particularly to Fig. 1 there is shown schematically a cathode ray tube comprising an elongated glass envelope which has a relatively slender stem portion 10 and an enlarged bulbous portion 11. The latter portion is provided with a window 12 through which an observer may view a luminescent screen 13 applied to the inner surface of the window. The nature of the screen will be explained in detail at a later point.

At the end of the envelope remote from the screen 13 there is provided an arrangement for generating a cathode ray beam (i. e., a concentrated stream of electrons). The means employed for this purpose may comprise any conventional type of "electron gun" and in the present instance is illustrated diagrammatically as comprising an electrically heated cathode 16 which is enclosed within a control or focusing cylinder 17. Adjacent the extremity of the cylinder 17 there is provided an apertured electrode or grid 20 which is adapted to be maintained at a positive potential with reference to the cylinder and which has the function of initially accelerating the electrons developed by the cathode 16 toward the screen 13. Final acceleration of the electrons is provided by a high voltage anode consisting of a layer of graphite, or other appropriate conductive material, deposited on the inner lateral wall surface of the tube envelope as indicated at 21. A terminal connection for this conductive layer is provided by a lead-in conductor arrangement shown at 22.

Outside the discharge envelope and between the electrode 20 and the screen 13 there is provided a magnetic focusing coil 23. In addition, two sets of deflecting coils 24, 25 are provided. These coils are adapted to produce mutually perpendicular deflections of the beam in such fashion as to cause it to move over the surface of the screen 13. The nature of the deflection which is thus obtained is controlled by connecting the terminals of the coils 24 and 25 to a suitable controlling apparatus 26 which for present purposes may be assumed to comprise the elements of a range and direction-finding equipment. Depending upon the nature of the potentials impressed upon the deflecting coils 24 and 25 by the equipment 26, the cathode ray beam may be caused to develop varying traces upon the luminescent screen 13, which traces may be interpreted by an informed observer in terms of the factors desired to be ascertained by the use of the equipment.

In operation, a device containing a screen of the type presently to be described operates in such manner that a visible trace is produced, the location on the screen and form of which is governed by the impulses received by the equipment of which the cathode ray tube is a part. By proper interpretation of the form of this visible trace information concerning the reflection of impulses and thereby of the position and movement of a distant object is ascertained.

It is desirable that the luminosity of the images formed on the screen at the time of impingement of cathode ray and the phosphorescent luminosity and its phosphorescent rate of decay when the cathode rays or other source has ceased to excite luminosity shall not differ too greatly. If the phosphorescent afterglow of the trace is too faint in luminosity in relation to the fluorescent luminosity then the trace is difficult to observe during the period of phosphorescent afterglow. It is the object of my invention to reduce the difference in luminosity between the intensities of the fluorescent and phosphorescent light emission of the screen.

In Fig. 2 are shown two curves numbered 30 and 31, one of which is illustrative of the characteristics of phosphors embodying my invention, the ordinates being units of luminosity in an arbitrary scale and the abscissae being elapsed time units.

Curve 30 indicates the luminosity due to fluorescence and phosphorescence of a zinc silicate phosphor activated with manganese and containing about 0.01 per cent of oxide of arsenic calculated as the pentoxide, $As_2O_5$. If the luminosity during the period of fluorescence, i. e., when the exciting source is acting on the phosphor, is represented in 100 units, then when at zero on the scale the exciting source ceases to function, the luminosity falls off rapidly, dropping to one-fourth its fluorescent value (25 units) in about 37 time units.

Curve 31 indicates the luminosity of a similar phosphor containing about 0.50 per cent of arsenic oxide ($As_2O_5$). The fluorescent luminosity is just below 40 units. When the exciting source ceases to function, its phosphorescent luminosity drops less rapidly, requiring about 70 time units to fall to one-fourth its fluorescent value (10 units). The disadvantage of decreased luminosity of fluorescence in observing results on the viewing screen 13 is far outweighed by the very substantial decrease in rate of decay of luminosity.

Favorable results are obtained with viewing screens comprising suitably activated zinc or cadmium silicate phosphors containing about 0.02 to 1.00 per cent oxide of arsenic calculated as $As_2O_5$. Preferred phosphors contain about 0.03 to 0.50 per cent of oxide of arsenic, $As_2O_5$, and amounts of manganese ranging from 0.001 to 0.5 per cent.

These phosphors may be prepared by adding desired amounts of oxide, or other suitable compound, of arsenic to the other phosphor-forming ingredients. The components may be combined with one another in accordance with the method described in my prior United States Patent 2,252,500, patented August 12, 1941.

In the preparation of a zinc (or cadmium) silicate phosphor, suitably purified solutions of zinc (or cadmium) nitrate and manganese nitrate are mixed with a solution of ethyl silicate. This mixture is caused to gel and the gel is converted into a dry powder by evaporation. To this powder a desired amount of oxide of arsenic is associated, for example as an aqueous solution of the oxide. Upon evaporation of the solvent the mixture is fired at about 1100° C. for about 15 hours. Considerable variation of firing temperature is permissible. As described in the above patent, the firing temperature for the phosphor may vary within the limits of about 1000 to 1300° C.

Satisfactory phosphors also may be prepared by mixing finely divided zinc oxide and silica in a state of high purity and adding desired amount of manganese and arsenic. The two latter compounds may be introduced as suitable solutions and caused to form a paste with the finely divided zinc oxide and finely divided silica. Upon evaporation of the liquid medium the resulting mixed powder is fired at temperature within the range of about 1000 to 1300° C. as above described.

The preparation of the arsenic-containing phosphor is not limited to the described methods which are stated only for illustrative purposes, my invention not being limited to these particular examples nor to the described method of preparation.

What I claim as new and desire to secure by Letters Patent of the United States is:

1. A luminescent cathode ray screen material consisting of an activated silicate of a metal chosen from the class consisting of zinc and cadmium having incorporated therein about .02 to 1.00 per cent of arsenic oxide, calculated as $As_2O_5$.

2. A luminescent material which is suitable for cathode ray apparatus consisting of an activated silicate of zinc containing about 0.02 to 1.00 per cent of pentoxide of arsenic.

3. A cathode ray screen consisting mainly of an activated luminescent zinc silicate having incorporated therein about 0.5 to 1.00 per cent of pentoxide of arsenic.

4. A cathode screen consisting essentially of manganese-activated luminescent zinc silicate having incorporated therein about 0.03 to 0.50 per cent of pentoxide of arsenic.

GORTON R. FONDA.